Jan. 2, 1934.  K. F. GALLIMORE  1,942,092
REMOTE CONTROL FOR MOVABLE MEMBERS OF MACHINE TOOLS
Filed June 5, 1931   7 Sheets-Sheet 3
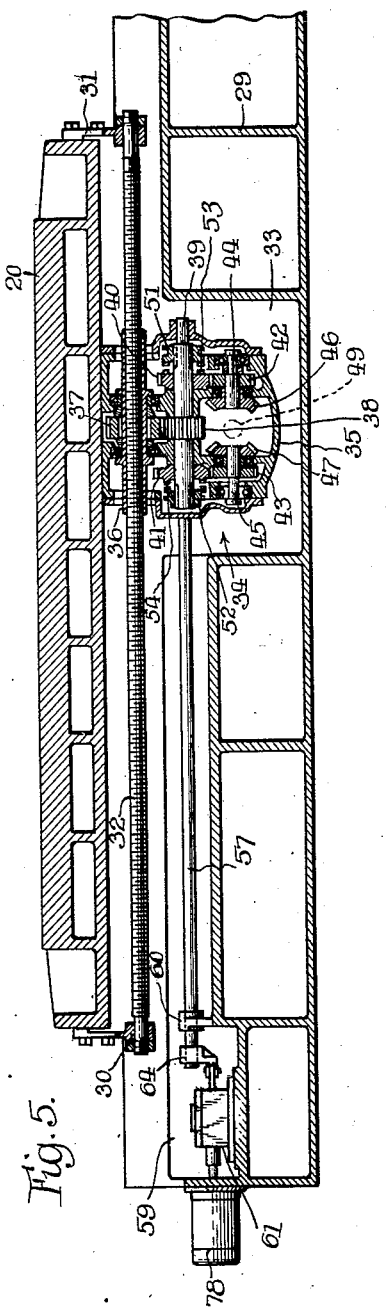
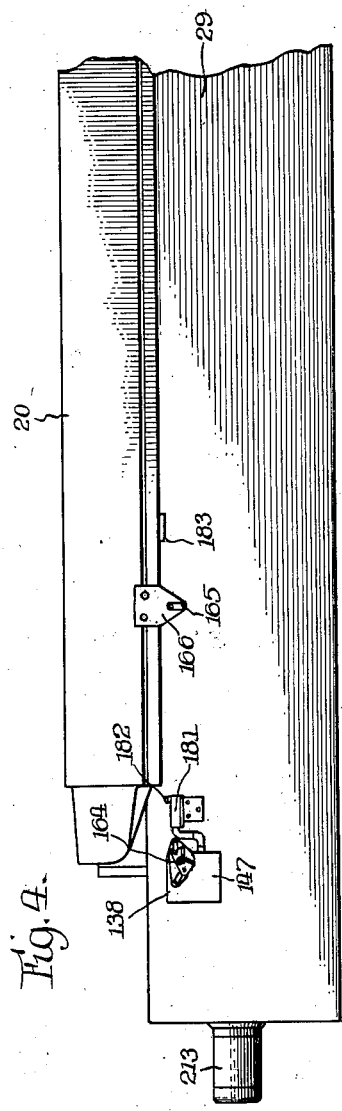
Inventor:
Keith F. Gallimore,
By Chindahl, Parker & Carlson
Attys.

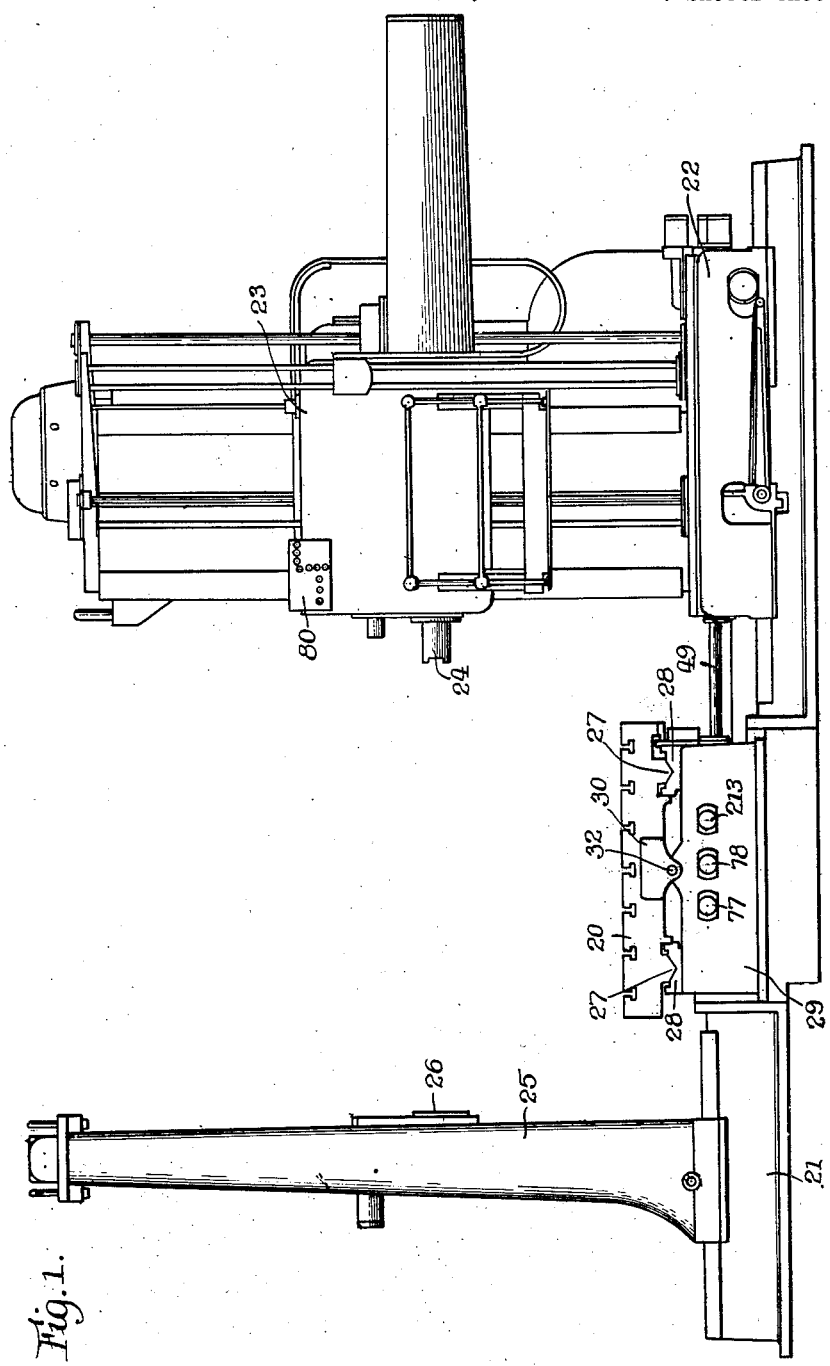

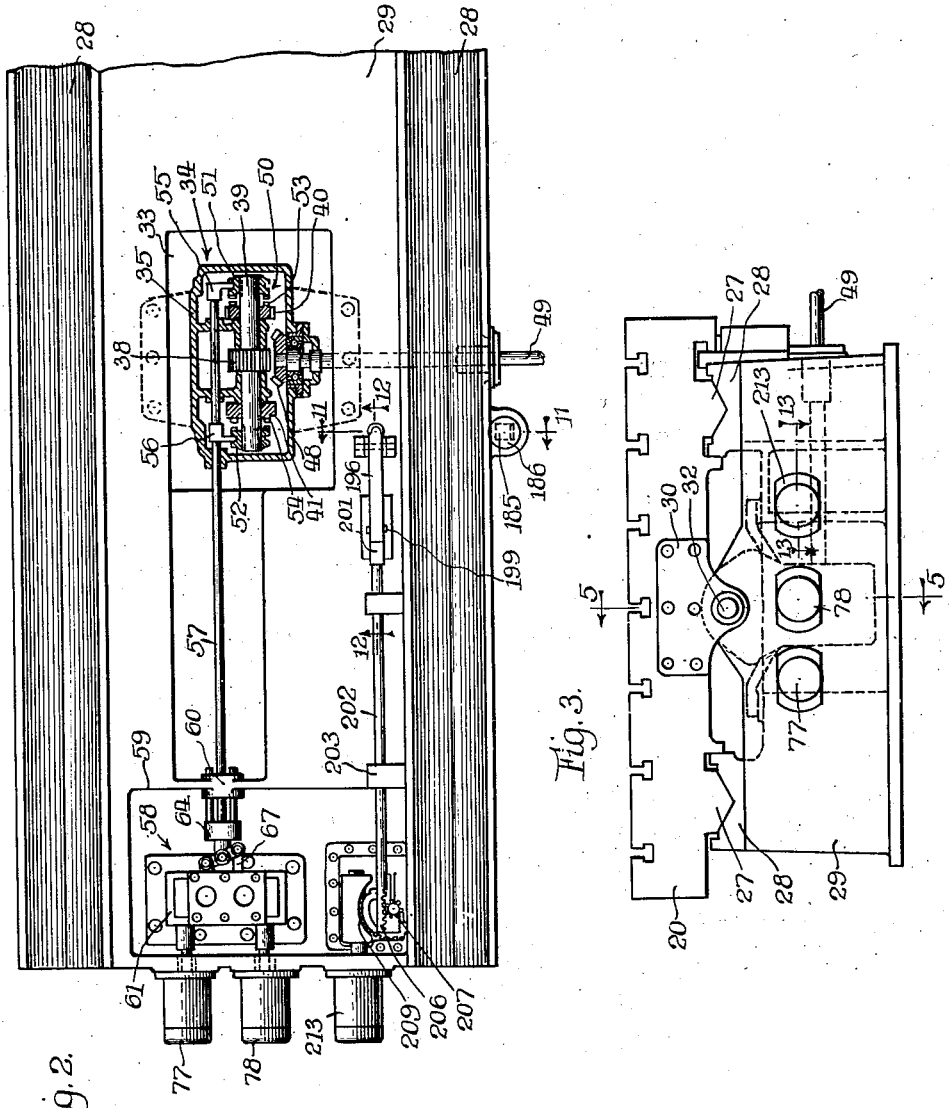

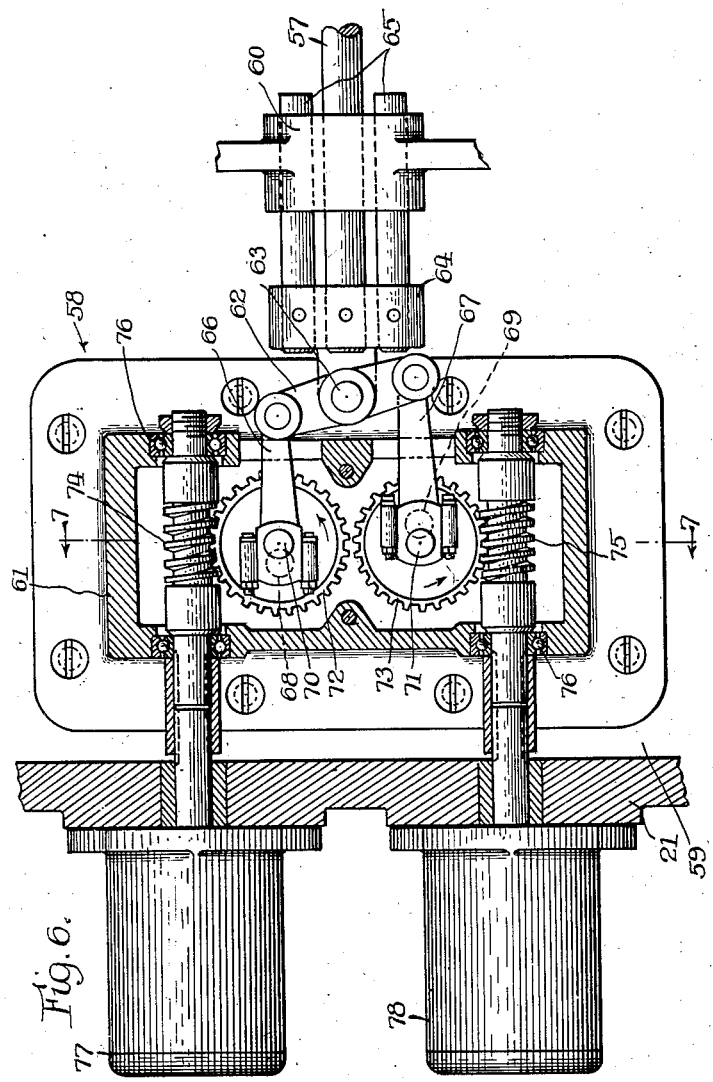

Jan. 2, 1934.  K. F. GALLIMORE  1,942,092
REMOTE CONTROL FOR MOVABLE MEMBERS OF MACHINE TOOLS
Filed June 5, 1931   7 Sheets-Sheet 5

Inventor:
Keith F. Gallimore,
By Chindahl, Parker & Carlson
Attys.

Jan. 2, 1934.  K. F. GALLIMORE  1,942,092
REMOTE CONTROL FOR MOVABLE MEMBERS OF MACHINE TOOLS
Filed June 5, 1931  7 Sheets-Sheet 6
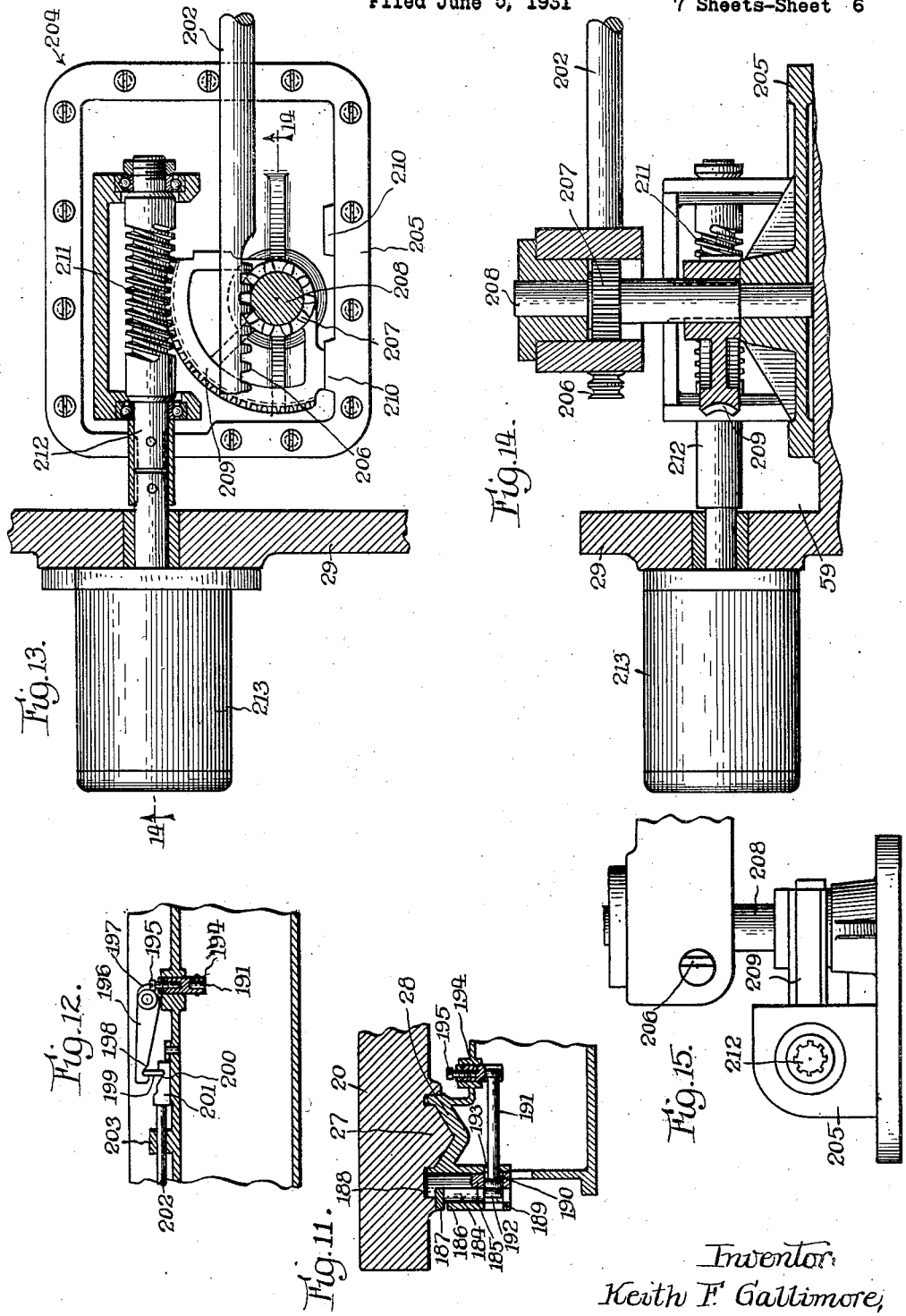

Jan. 2, 1934.   K. F. GALLIMORE   1,942,092
REMOTE CONTROL FOR MOVABLE MEMBERS OF MACHINE TOOLS
Filed June 5, 1931   7 Sheets-Sheet 7
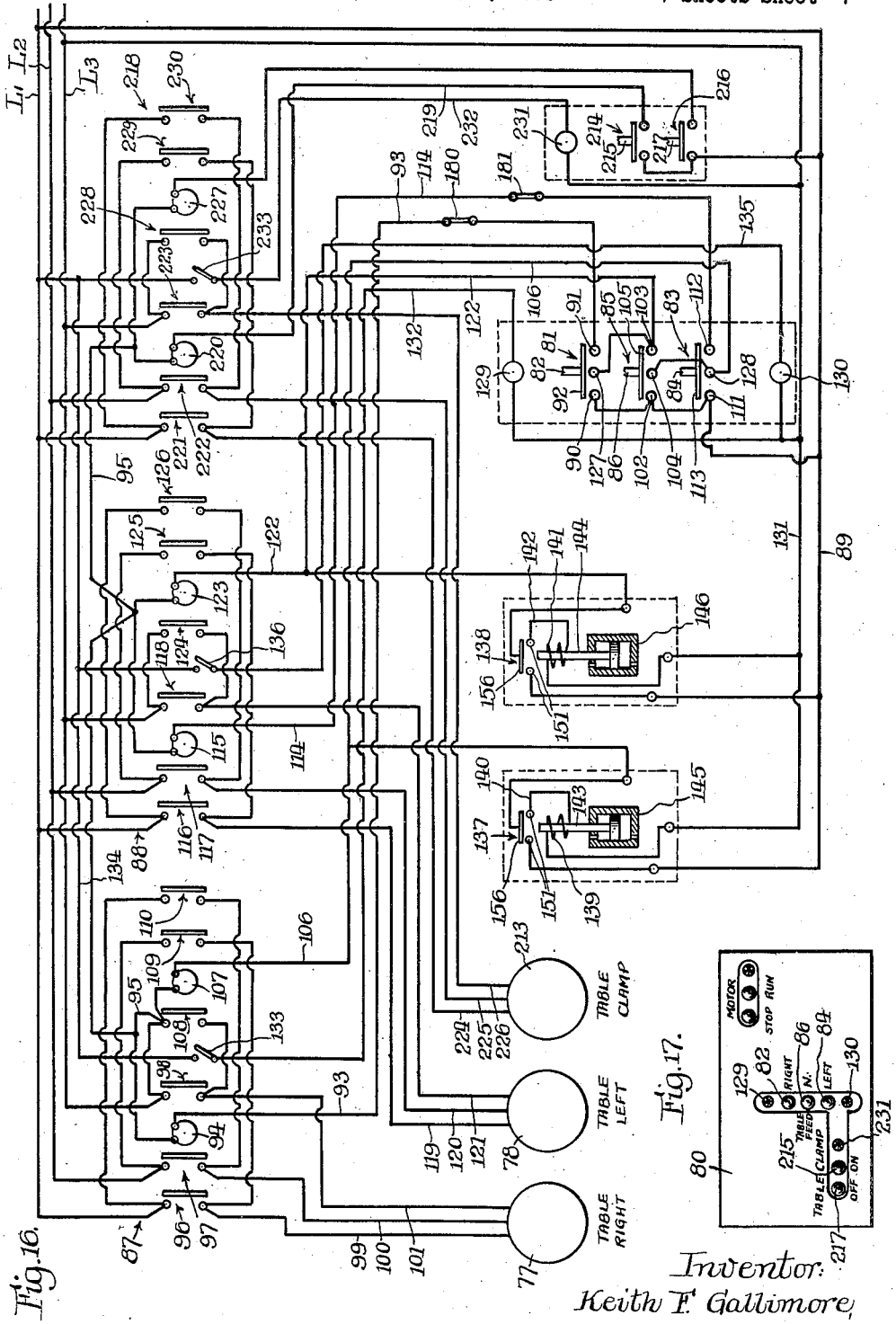

Patented Jan. 2, 1934

1,942,092

UNITED STATES PATENT OFFICE

1,942,092

REMOTE CONTROL FOR MOVABLE MEMBERS OF MACHINE TOOLS

Keith F. Gallimore, Fond du Lac, Wis., assignor to Giddings & Lewis Machine Tool Co., Fond du Lac, Wis., a corporation of Wisconsin Application June 5, 1931. Serial No. 542,262

33 Claims. (Cl. 29—26)

The present invention relates to improvements in machine tools, such for example as horizontal boring machines, and has particular reference to a novel remote control for the movable members of machine tools.

Machine tools ordinarily comprise one or more translatory members, such for example as a table, a column, a headstock or a spindle, or various combinations thereof. The translatory movement may be rectilinear or non-rectilinear and may be utilized to provide a rapid traverse, feed or adjustment. Certain members, such as a spindle, may be translatory and rotatable, or merely rotatable. Where a member is power driven, the translatory movement usually is reversible through the agency of a reversing clutch. In some instances, rotational movement also is reversible. Where a member is heavy, or arranged for other than vertical movement, or where extreme precision and accuracy are desired, a clamp available at will is usually provided for holding the member securely in position of rest.

The primary object of the present invention resides in the provision of novel electrical means, independent of the drive means, for controlling the operation of a machine tool member.

Another object resides in the provision of new and improved electrical clutch actuating means, and in particular such means for the reversing clutch of a movable machine tool member.

A further object is to provide a novel electrical clutch actuating means comprising one or more control elements, such as push buttons, adapted to be located remotely of the machine tool member under the control of the operator.

Still other objects are to provide a new and improved electrical actuating means for a reversing clutch adapted for controlling the starting and stopping and also the direction of movement of a movable machine tool member, and including a plurality of selective control elements, one element for instituting movement of the member in one direction, another element for instituting movement of the member in the other direction, and a third element intermediate the direction elements for effecting the stopping of the member, the elements being arranged in alinement in a plane parallel to the member so that the relative position of the end elements is indicative of the respective directions of movement of the member adapted to be instituted through the actuation thereof. Thus, for a horizontally movable member, actuation of the control element on the right would effect movement of the member to the right, and actuation of the control element on the left would institute movement of the member to the left.

Another object is to provide a plurality of signal lamps, one for and mounted adjacent and preferably directly over each direction control element, which will become illuminated to indicate the actuation thereof.

An important object resides in the provision, in combination with an electrical actuating means for a reversing clutch in the drive for a reciprocatory machine tool member, of two limit switches which are automatically operable by the member upon movement thereof respectively into its extreme predetermined end positions, and each of which upon being actuated is effective through the clutch actuating means to stop the member.

Another object is to provide, in combination with each limit switch, a time limit relay means for breaking the operating circuit of the clutch actuating means shortly after the machine tool member has come to rest.

A further object resides in the provision of interlocking means between the starting control elements and the limit switches of the electrical clutch actuating means for preventing institution of movement of the member when at either limit except in a direction away from said limit.

Other important objects reside in the provision of novel electrically operable means for clamping the member at will in rest position, of manual control elements for said means and mounted with the control elements for the clutch actuating means on a common panel, and of a signal lamp associated with the clamp control elements.

Still another object resides in the provision of an interlock between the drive means and the clamp for the member so that movement of the member can not be instituted while the clamp is applied.

Various other objects and advantages reside in the specific structural features of the devices employed, and will become apparent as the description proceeds.

In the accompanying drawings, Figure 1 is a front elevational view of a machine embodying the features of my invention.

Fig. 2 is a fragmentary plan view of the base for supporting a reciprocatory table to which the invention is specifically applied.

Fig. 3 is a front end view of the table assembly.

Fig. 4 is a fragmentary right side elevational view of the table assembly.

Fig. 5 is a vertical sectional view taken substantially along line 5—5 of Fig. 3.

Fig. 6 is a fragmentary horizontal sectional view of the clutch operating mechanism taken along line 6—6 of Fig. 7.

Fig. 7 is a vertical sectional view taken substantially along line 7—7 of Fig. 6.

Fig. 8 is a detail sectional view taken substantially along line 8—8 of Fig. 7.

Fig. 11 is a fragmentary detail sectional view of the table clamp taken substantially along line 11—11 of Fig. 2.

Fig. 12 is a fragmentary detail sectional view taken along line 12—12 of Fig. 2.

Fig. 13 is a sectional view, taken along line 13—13 of Fig. 3, of the clamp actuating means.

Fig. 14 is a sectional view taken along line 14—14 of Fig. 13.

Fig. 15 is a fragmentary detail view of the clamp actuating means.

Fig. 16 is a diagrammatic representation of the electric control circuit.

Fig. 17 is an enlarged view of the control panel.

Figure 9:
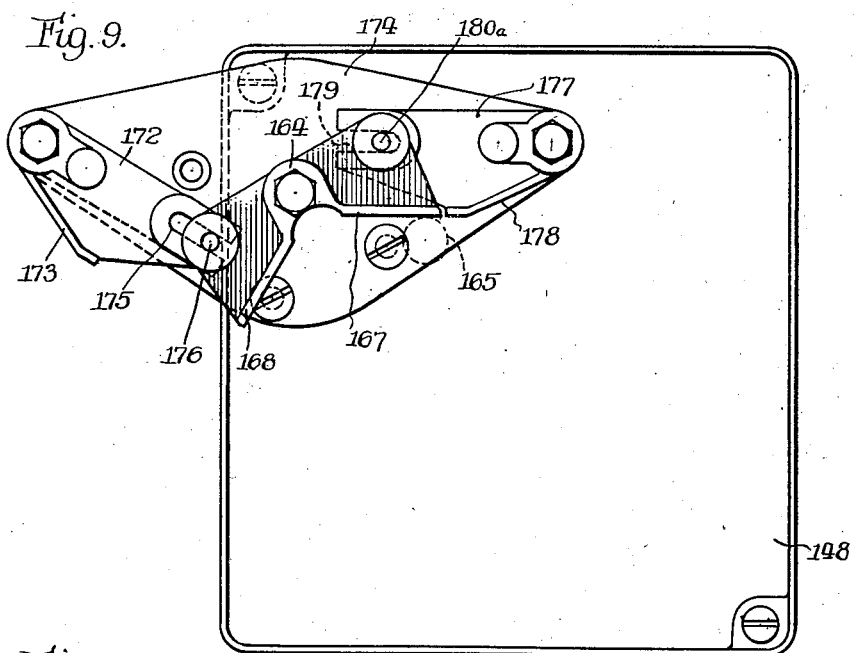
Fig. 9 is an enlarged elevational view of one of the limit switches.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The invention in its broad aspects is applicable generally to clutches and motion control devices of various types. Moreover, it is applicable to various movable members of machine tools. Referring more particularly to the drawings, the invention in its exemplary embodiment has been shown for purposes of illustration as applied to a reciprocatory table 20 forming part of a horizontal boring machine shown in Fig. 1. The boring machine also comprises a base 21 on which the table 20 is mounted, a headstock column 22 mounted for translation on one end of the base, a headstock 23 with a rotatable and axially adjustable spindle 24 mounted for vertical movement on the column, a tailstock column 25 translatably mounted on the other end of the base, and a tailstock 26 mounted for vertical movement on the column 25.

The table 20 (see Figs. 2 to 5) has parallel V-shaped ways 27 on the underside slidably mounted in parallel ways 28 formed in the top of a transverse section 29 of the machine base 21. Secured at its ends against rotation and endwise movement in depending front and rear bearing brackets 30 and 31 on the ends of the table 20 is a traverse screw 32. The interior of the base 21 is formed with a hollow central compartment 33 in which a suitable gear transmission drive unit 34 is mounted. The unit 34 comprises a housing 35 through which the screw 32 extends.

A feed nut 36 is rotatably mounted in the upper part of the housing 35, and is in threaded engagement with the screw 32. The nut 36 is rigid with a gear 37 which meshes with a gear 38 fixed on a shaft 39 journaled in the housing 35. Freely rotatable on opposite ends of the shaft 39 are two gears 40 and 41 which mesh respectively with two gears 42 and 43 fixed on stub shafts 44 and 45 journaled in axially alined and spaced relation in the housing 35. Bevel gears 46 and 47 are fixed respectively on the adjacent ends of the shafts 44 and 45, and mesh with a bevel gear 48 fixed on a drive shaft 49 extending longitudinally through the base 21 to the column 22 for connection to a suitable source of power (not shown).

The gears 40 and 41 are adapted to be connected selectively to the shaft 39 to establish the table drive. A clutch of any suitable type may be provided for this purpose, and in the present instance, a reversing clutch 50 (see Figs. 2 and 5) is shown. In its preferred form, the clutch 50 comprises two annularly grooved clutch elements 51 and 52 slidably keyed to opposite ends of the shaft 39 for movement respectively into engagement with clutch teeth 53 and 54 on the outer faces of the gears 40 and 41. Shifter shoes 55 and 56, rigidly secured to a slidable shifter rod 57 extending from the front of the base 21 into the housing 35, respectively engage the clutch elements 51 and 52 and are adapted to move said elements as a unit. It will be evident that when the gear 40 is connected to the shaft 39, the table 20 will be moved in one direction, in the present instance forwardly, and when the gear 41 is connected to the shaft 39, the table 20 will be moved in the opposite direction, and when the clutch elements 51 and 52 assume an intermediate position the table 20 will be at rest.

The forward end of the clutch shifter rod 57 is operatively connected to a clutch control mechanism 58 mounted in a compartment 59 formed in the front end of the base 29. The rod 57 extends into the compartment 59 through a bearing guide 60 formed in the base 21. The mechanism 58 (see Figs. 6, 7 and 8) comprises a housing 61 mounted on the floor of the compartment 59. In its preferred form, the mechanism 58 comprises two parallel rocking links 62 pivotally connected centrally of their ends at 63 to a head 64 rigidly secured to the forward end of the shifter rod 57. Two guide pins 65 secured to the head 64 at opposite sides of and parallel to the rod 57 extend slidably through the bearing guide 60. The opposite joint ends of the links 62 are operatively connected respectively through connecting rods 66 and 67 to crank pins 68 and 69 on the upper ends of two juxtaposed vertical crank shafts 70 and 71 journaled in the housing 61. Two worm wheels 72 and 73 respectively are secured to the shafts 70 and 71, and mesh with two horizontal worms 74 and 75 journaled in end and radial thrust ball bearings 76 in the housing 60. The worms 74 and 75 are directly connected to two high torque electric motors 77 and 78 which are mounted on the outside of the front of the base 21.

The crank shafts 70 and 71 are limited to rotation through 180° by means of two pairs of limit stops 79 (see Figs. 7 and 8), one pair for each shaft with the stops thereof disposed at opposite sides of the shaft axis for engagement by opposite sides of the crank arm 79ª, formed in the structure of the housing 61.

The motors 77 and 78 are subject to manual control from a remote point convenient and readily accessible to the operator. In the present instance, three manually operable control elements are mounted in a panel 80 on the headstock 23, and preferably comprise respectively a switch 81 with a push button actuator 82 for instituting operation of the motor 77 to effect movement of the table 20 rearwardly, a switch 83 with a push button actuator 84 for instituting operation of the motor 78 to effect movement of the table forwardly, and a stop switch 85 with a push button actuator 86 for effecting the reverse operation of either or both motors into neutral. Two reversing contactors 87 and 88 under the control of the push buttons 82, 84 and 86 are provided respectively for the motors 77 and 78. Current is adapted to be supplied from the mains $L_1$, $L_2$, and $L_3$.

The clutch control mechanism 58 is shown in neutral position in Fig. 6. Referring particularly to Fig. 16, upon actuation of the button 82, the main $L_1$ is connected through line 89, the switch 81 which comprises fixed contacts 90 and 91 and a movable contact 92, line 93, electromagnet 94, and line 95 to the main $L_3$. Excitation of the electromagnet 94 causes the contactor 87 to close switches 96, 97 and 98 which serve to connect the mains $L_1$, $L_2$ and $L_3$ respectively through lines 99, 100 and 101 to the motor 77. Thereupon the table 20 will be driven rearwardly. Upon actuating the button 86, the main $L_1$ is connected through the line 89, the switch 85 which comprises fixed contacts 102, 103 and 104 and movable contact 105, line 106, electromagnet 107 and the line 95 to the main $L_3$. Excitation of the electromagnet 107 effects reversal of the contactor 87 to close switches 108, 109 and 110 which serve to connect the mains $L_1$, $L_2$ and $L_3$ respectively through the lines 101, 100 and 99 to the motor 77. Thereupon, the motor 77 will be reversed into neutral position to disengage the clutch element 52 to stop the table 20.

Similarly, actuation of the button 84 connects the main $L_1$ through the line 89, the switch 83 which comprises fixed contacts 111 and 112 and movable contact 113, line 114, electromagnet 115 and the line 95 to the main $L_3$. Excitation of the electromagnet 115 causes the contactor 88 to close switches 116, 117 and 118 which serve to connect the mains $L_1$, $L_2$ and $L_3$ respectively through lines 119, 120 and 121 to the motor 78. Thereupon, the motor 78 is operated to engage the clutch element 51 to cause the table 20 to travel forwardly. Upon actuation of the stop button 86, the main $L_1$ is connected through the line 89, the switch 85, line 122, electromagnet 123 and the line 95 to the main $L_3$. Excitation of the electromagnet 123 effects reversal of the contactor 88 to close switches 124, 125 and 126 which serve to connect the mains $L_1$, $L_2$ and $L_3$ respectively through the lines 121, 120 and 119 to the motor 78. Thereupon, the motor 78 will be reversed into neutral position to disengage the clutch element 51 to stop the table 20.

So that the stop switch 85 need not be closed, when a reversal of direction of the table 20 is desired, the switch 81 has a contact 127 connected to the contact 103 and adapted to short-circuit the switch 85 to the line 122, and the switch 83 has a contact 128 connected to the contact 104 and adapted to short circuit the switch 83 to the line 106.

The buttons 82, 86 and 84 are arranged in vertical alinement on the panel 80, reading downwardly in the order mentioned. Movement of the table 20 rearwardly, as viewed from the right end of the machine naturally suggests actuation of the upper button, and movement of the table forwardly naturally suggests actuation of the lower button. The arrangement thus is suggestive and tends to prevent errors by the operator.

To further guard against errors, signal lamps 129 and 130 are associated respectively with the buttons 82 and 84 on the panel 80. The lamp 129 is located directly above the button 82, and is connected in a circuit leading from the main $L_3$ through line 131, line 132, switch 133 and line 134 to the main $L_1$. The switch 133 will close upon excitation of the electromagnet 94, and will open upon excitation of the electromagnet 107. Thus the lamp 129 will be illuminated while the button 82 is depressed and thereafter while the rearward feed is connected. The lamp 130 is located directly below the button 84, and is connected in a circuit leading from the line 131 through line 135, switch 136 to the line 134. The switch 136 is adapted to be opened and closed upon the respective excitations of the electromagnet 115 and 123. Thus the lamp 130 will be illuminated while the button 84 is depressed and thereafter while the forward feed is connected. It will be understood that in the present arrangement of circuits, power is supplied to one or the other or both of the motors 77 and 78 only while the appropriate button is held depressed. When actuation of the clutch 50 has been completed, the button is released.

Figure 10:
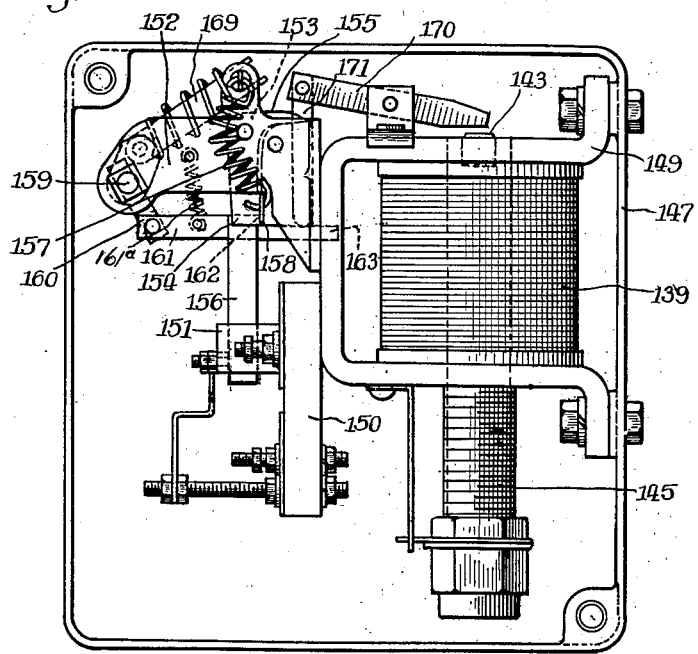
Fig. 10 is a view similar to Fig. 9 but with the front cover removed.

Mounted near opposite ends of the transverse section 29 of the base 21 are suitable limit stops for automatically effecting actuation of the clutch 50 at the extreme limits of movement of the table 20. Referring to Figs. 9, 10 and 16, the limit stops comprise respectively two switches 137 and 138 in parallel with the stop switch 85 from the line 89 respectively to the lines 106 and 122. Upon closing the switch 137, a shunt circuit is closed from the line 131 through a solenoid 139, line 140 and the switch 137 to the line 106. Likewise, closing of the switch 138 serves to close a shunt circuit from the line 131 through a solenoid 141, line 142 and the switch 138 to the line 122. The solenoids 139 and 141 respectively comprises axially reciprocable cores 143 and 144 controlled by dash pots 145 and 146. Thus, upon closing either switch to stop the table 20, the associated solenoid will be energized, thereby causing the associated core after a predetermined time interval, governed by the associated dash pot, to engage and open the switch. The time interval is sufficient to permit the operation of the clutch 50. As a result, current is impressed through the associated motor 77 or 78 only as long as necessary.

The stop switches 137 and 138 may be of any suitable type, and in the present instance are substantially alike in construction. Hence, a detailed description of the rear switch 137 will suffice for both, and corresponding parts, not already identified will be designated by like character references.

The switch 137 (see Figs. 9 and 10) comprises a housing 147 with a removable cover 148 mounted on the side and adjacent the rear end of the base section 29. Mounted in the housing 147 is a bracket 149 for supporting the solenoid 139. The dash pot 145 is mounted on the underside of the bracket 149. A base plate 150 of insulating material also is mounted on the bracket 149, and supports two fixed contacts 151 forming part of the switch 137. Pivotally mounted in a bracket 152 secured to the bracket 149 is a bell-crank lever 153 having a depending arm 154 and a heel 155. A switch blade 156 constituting the movable contact of the switch 137 is rigidly secured to the arm 154 for movement into and out of engagement with the contacts 151. A coiled tension spring 157 anchored at its lower end to a lug 158 on the lower end of the arm 154 and at its upper end to the bracket 152, and bearing intermediate its ends against the pivot of the lever 153 tends to move the blade 156 out of engagement with the contacts 151.

Rotatably mounted in the bracket 152 is a rock shaft 159. A lever 160 secured to the rock shaft 159 is pivotally connected at its free end to one end of a link 161. The other end of the link 161 is formed with a shoulder or notch 162 adapted to engage the lower end of the arm 154, and with a reduced trip extension 163. A coiled tension spring 161ª anchored to the bracket 152 tends to urge the link 161 upwardly against the arm 154. It will be evident that upon rocking the shaft 159 in a counter-clockwise direction, the link 161 through engagement of the shoulder 162 with the arm 154 will swing the blade 156 into engagement with the contacts 151 to close the switch 137, and thereby stop rearward movement of the table 20.

Secured to the shaft 159 outside of the cover 148 is a trip lever 164 disposed in the path of a suitable abutment 165 mounted on the table 20. In the present instance, the abutment 165 is provided in the form of a pin on a depending bracket 166 mounted for adjustment longitudinally of the table 20.

It will be understood that the pin 165 may be positioned to engage the lever 164 at the extreme limit of rearward movement of the table 20, or at any other desired point in its rearward travel. The lever 164 has two webbed diverging arms 167 and 168, spaced slightly more than 90°. The arm 167 is adapted for engagement by the pin 165 to close the switch 137, and the arm 168 is adapted for engagement by the pin on the return movement of the table 20 to reset the lever 164 in operative position. In Fig. 9, the lever 164 is shown in the position that it assumes after engagement by the pin 165 to close the switch 137. A spring-actuated toggle mechanism 169 is provided for holding the shaft 159 yieldingly in one position or the other.

To open the switch 137 after a predetermined time interval, sufficient in duration to permit operation of the clutch 50, the solenoid core 143 is operable to effect disengagement of the link 151 from the arm 154. In the present instance, the upper end of the core 143 closely underlies one end of a lever 170 pivoted intermediate its ends on the bracket 149. The other end of the lever 170 carries a pivotally suspended pin 171 resting at its lower end against the link extension 163.

Upon excitation of the solenoid 139, the core 144 will move upwardly, and thereby through the lever 170 and pin 171 disengage the shoulder 162 from the arm 154, to release the switch blade 156. The lever 170 will then engage the heel 155 to assure definite opening of the switch 137. Should the table 20 be reversed immediately, the switch 137 would be opened through actuation of the lever 164 if it has not already been opened by the solenoid 139.

Provision is made for preventing mal-adjustment of the trip lever 164. To this end, a lever 172 with an inclined cam face 173 along its lower edge is pivotally mounted at its forward end on a plate 174 on the front of the cover 148. The free rear end of the lever 164 has a longitudinal slot 175 slidably engaging a pin 176 on the web of the lever arm 168. Likewise, a lever 177 with an inclined cam face 178 along its lower edge is pivotally mounted at its rear end on the plate 174, and has a longitudinal slot 179 in its forward end slidably engaging a pin 180ª on the web of the lever arm 167. The pivots for the levers 172 and 177 are somewhat above the shaft 159.

It will be evident that if the lever 164 should be mal-adjusted so that the arm 168 is disposed in the path of the rearwardly moving pin 165, the cam face 173 will also be so disposed, and will upon being engaged by the pin effect the automatic return of the lever into its proper position. The cam face 178 has a similar function for forward movement of the pin 165 past the lever 164.

Associated respectively with the limit switches 137 and 138 are two interlock switches 180 and 181 which serve to prevent actuation of the clutch 50 in a direction to effect movement of the table 20 beyond either extreme limit when the table is at such limit, but which do not prevent actuation of the clutch in a reverse direction to effect movement of the table toward the other limit. The switches 180 and 181 are interposed respectively in the lines 93 and 114, and are mounted on the base section 29 adjacent to but preferably between the switches 137 and 138. The specific construction of the switches 180 and 181 forms no part of the present invention, and hence is not disclosed. It is sufficient to say that each switch is normally open and comprises a plunger or stem 182 adapted for engagement by a cam 183 on the table 20 when the latter is in the extreme end position.

Another feature of the invention resides in the provision of novel electrically operable clamps for the machine tool members. In the present instance, a clamp for the table 20 is shown. The clamp in its preferred form comprises two juxtaposed relatively slidable jaws 184 and 185 mounted in a housing 186 on the side of the base section 29. The outer jaw 184 is adapted to move upwardly into engagement with the underside of a gib or clamp plate 187 on the underside of the table 20. The inner jaw 185 has a lateral toe 188 overlying the inner edge of the plate 187 and adapted to move downwardly into clamping engagement therewith. The lower ends of the jaws 184 and 185 are formed with two substantially registering openings 189 and 190. A lever 191 is formed with two spherical bearing segments 192 and 193 disposed respectively in the openings. The inner end of the lever 191 underlies a plunger 194 vertically slidable in the base 21 and provided in its upper end with an adjusting screw 195. A lever 196 pivoted intermediate its ends in the base 21 has a toe 197 on one end adapted for engagement with the screw 195 to lower the plunger 195 and thereby through actuation of the lever 191 move the jaws 184 and 185 into clamping engagement with the plate 187. The other end of the lever 196 is formed with a notch or seat 198 engaging one end of a toggle pin 199.

The other end of the pin 199 rests in an upwardly facing toggle seat 200 formed on a reciprocable block 201. An actuating rod 202 guided in lugs 203 is secured at one end to the block 201 and at the other end to a clamp actuating mechanism indicated generally at 204. In the present instance, the clamp actuating mechanism 204 is mounted in the base compartment 59, and comprises a suitable housing 205. The outer end of the rod 202 is formed with a gear rack 206 which meshes with a pinion 207 on a vertical shaft 208 journaled in the housing 205. Secured to the shaft 208 is a gear segment 209. Stops 210 formed in the housing 205 limit the movement of the gear segment 209 to 90°. The gear segment 209 meshes with a worm 211 on a shaft 212 which is journaled in the housing 205 and is connected directly to a reversible torque motor 213 mounted on the outside of the base section 29. The motor 213 is subject to manual control from a remote point convenient and readily accessible to the operator. In the present instance, two manually operable control elements are mounted in the panel 80 on the headstock 23 and preferably comprise a switch 214 with a push button actuator 215 for instituting operation of the motor 213 to clamp the table 20 in position and a switch 216 with a push button actuator 217 for effecting the reverse operation of the motor to release the table clamp. A reversing contactor 218 under the control of the push buttons 215 and 217 is provided for the motor 213.

The clamp actuating mechanism 204 is shown in inoperative position in Fig. 13 and the clamp is shown applied in Fig. 11. Referring more particularly to Fig. 16, upon actuation of the push button 215, the main $L_1$ is connected through the line 89, the switch 214, line 219, electromagnet 220, and the line 95 to the main $L_3$. Excitation of the electromagnet 220 causes the contactor 218 to close switches 221, 222 and 223 which serve to connect the mains $L_1$, $L_2$ and $L_3$ respectively through lines 224, 225 and 226 to the motor 213. Thereupon the table clamp will be actuated to secure the table in position. Upon actuating the push button 217, the main $L_1$ is connected through the line 89, the switch 216, electromagnet 227 and the line 95 to the main $L_3$. Excitation of the electromagnet 227 effects reversal of the contactor 218 to close switches 228, 229 and 230 which serve to connect the mains $L_1$, $L_2$ and $L_3$ respectively through the lines 226, 225, and 224 to the motor 213. Thereupon the motor 213 will be reversed into its idle position to disengage the table clamp.

The push buttons 215 and 217 are arranged in horizontal alinement (see Fig. 17) with the one on the right for applying the table clamp and the one on the left for releasing the table clamp. This arrangement naturally suggests the proper button to be depressed, and hence facilitates the prompt and instinctive actuation of the desired push button. To indicate the condition of adjustment, a signal lamp 231 is associated with the push button 215 and preferably is located directly to the right thereof. The lamp 231 is connected in a circuit leading from the main $L_3$ through the line 131, line 232, switch 233 and the line 134 to the main $L_1$. The switch 233 will close upon excitation of the electromagnet 220 and will open upon excitation of the electromagnet 227. Thus, the lamp 231 will be illuminated while the clamp is applied.

The contactors 87, 88 and 218 are suitably interlocked so that when the table feed in either direction is connected, the motor 213 can not be set into operation to apply the table clamp, and when the table clamp is applied, neither of the table feeds can be instituted. The above interlock may be accomplished through suitable control circuits or through appropriate connections between the movable physical parts of the contactors. Thus, the armature of the solenoid 220 when the latter is actuated can through mechanical connection hold out each of the armatures of the electromagnets 94 and 115, and the armatures of the electromagnets 94 and 115, when either of these electromagnets is energized can hold out the armature of the electromagnet 220. The specific construction per se by which the interlock is accomplished forms no part of the present invention and hence is not shown.

I claim as my invention:—

1. In a machine tool, in combination, an operable machine element, a support for said element, means for actuating said element, said means including a connection control device movable into an operative position and an inoperative position, a shifter rod for moving said device into either position, a crank operatively connected to said rod, and a reversible electric motor for actuating said crank.

2. In a machine tool, in combination, an operable machine element, a support for said element, means for driving said element, said means including a control device for establishing a connection of said means to said element to drive the latter in one direction, means for actuating said device to establish or interrupt said connection, said last mentioned means including a reversible electric motor, fixed stop means independent of said device for limiting the extent of operation of said motor in each direction, and manually operable switch means for controlling the operation of said motor.

3. In a machine tool, in combination, an operable machine element, a support for said element, means for driving said element, said means including a control device for establishing a connection of said means to said element to drive the latter in one direction, a shifter member for said device, a crank operatively connected to said member, means for limiting the movement of said crank to 180°, and a reversible electric motor for driving said crank.

4. In a machine tool, in combination, an operable machine element, a support for said element, means for driving said element, said means including a control device for establishing a connection of said means to said element to drive the latter in one direction, a shifter rod for actuating said device, a lever pivotally connected to said rod, said lever being fulcrumed at one end, a crank arm connected to the other end of said lever, a crank for reciprocating said arm, a worm wheel connected to said crank, a worm meshing with said wheel, and a reversible electric motor for driving said worm.

5. In a machine tool, in combination, an operable machine element, a support for said element, means for driving said element in opposite directions, said means including a reversible control device for establishing the connection of said means to said element selectively for either direction of drive and for interrupting said connection, and means including two electric motors selectively available for actuating said device to establish or interrupt said connection.

6. In a machine tool, in combination, a movable machine element, a support for said element, means including a reversing clutch having an intermediate neutral position and having two closed positions for driving said element respectively in opposite directions, a plurality of independent electric drive means selectively available for actuating said clutch into any one of its normal positions, and manual means remote from said element for controlling said electric means.

7. In a machine tool, in combination, a movable machine element, a support for said element, means including a reversing clutch having an intermediate neutral position for driving said element in opposite directions, electric means for actuating said clutch into any one of its normal positions, and automatic means responsive to the movement of said element for automatically instituting operation of said electric means to actuate said clutch into its neutral position upon movement of said element into a predetermined position.

8. In a machine tool, in combination, a movable machine element, a support for said element, means including a reversing clutch having an intermediate neutral position for driving said element in opposite directions, a shifter rod for said clutch, a lever connected intermediate its ends to said rod, two crank arms connected respectively to opposite ends of said lever, two cranks operatively connected respectively to said arms, said cranks in the neutral position of said clutch occupying angular positions differing in phase, and means for selectively driving said cranks.

9. In a machine tool, in combination, a movable machine element, a support for said element, means including a reversing clutch having an intermediate neutral position for driving said element in opposite directions, a shifter rod for said clutch, a lever connected intermediate its ends to said rod, two crank arms connected respectively to opposite ends of said lever, two cranks operatively connected respectively to said arms, said cranks in neutral position of said clutch occupying angular positions differing in phase by 180°, means for limiting the movement of each crank to 180°, and two reversible electric motors for respectively driving said cranks.

10. In a machine tool, in combination, a movable machine element, a support for said element, means including a reversing clutch having an intermediate neutral position for driving said element in opposite directions, a shifter rod for said clutch, a lever connected intermediate its ends to said rod, two crank arms connected respectively to opposite ends of said lever, two cranks operatively connected respectively to said arms, said cranks in neutral position of said clutch occupying angular positions differing in phase, means for limiting the rotation of each crank to less than one revolution, two worm and worm wheel assemblies respectively connected to said cranks, two reversible electric motors respectively connected to said assemblies, and means for selectively controlling the operation of said motors.

11. In a machine tool, in combination, a movable machine element, a support for said element, means including a separable connection for driving said element, a reversible motor operable in opposite directions to open and close said connection, a circuit for operating said motor in one direction to close said connection, a circuit for operating said motor in the other direction to open said connection, and a circuit parallel to said last mentioned circuit and adapted to be closed automatically upon movement of said element into a predetermined position for operating said motor to open said connection.

12. In a machine tool, in combination, a movable machine element, a support for said element, means including a separable connection for driving said element, a reversible motor for opening and closing said connection, control circuits for said motor including a circuit for effecting operation of said motor to close said connection, a circuit for effecting operation of said motor to open said connection, and a normally open switch in said last mentioned circuit, and means on said element for automatically closing said switch upon movement of said element into a predetermined position.

13. In a machine tool, in combination, a movable machine element, a support for said element, means including a separable connection for driving said element, a reversible motor for opening and closing said connection, control circuits for said motor including a circuit for effecting operation of said motor to close said connection, said circuit including a normally closed switch, and a second circuit for effecting operation of said motor to open said connection, and means on said element for automatically opening said switch upon movement of said element into a predetermined position.

14. In a machine tool, in combination, a movable machine element, a support for said element, means including a separable connection for driving said element, a reversible motor for opening and closing said connection, control circuits for said motor including a circuit for effecting operation of said motor to close said connection, said circuit including a normally closed switch, and a circuit including a normally open switch for effecting operation of said motor to open said connection, and means carried by said element for automatically opening said first mentioned switch and automatically closing said second mentioned switch upon movement of said element into a predetermined position.

15. In a machine tool, in combination, a movable machine element, a support for said element, means including a reversing clutch with a neutral position and including two opposite directional feeds for driving said element, clutch actuating means including one motor for moving said clutch into and out of one feed position and a second motor for moving said clutch into and out of the other feed position, control circuits for said motors including a circuit for effecting operation of said one motor to close said clutch to effect movement of said element in one direction, a circuit for effecting operation of said one motor to open said clutch, a circuit for effecting operation of said second motor to close said clutch to effect movement of said element in the other direction, and a circuit for effecting operation of said second motor to open said clutch.

16. In a machine tool, in combination, a reciprocable member, means including a reversing clutch for driving said member, and electric means for actuating said clutch, said electric means including three alined manual control elements, the outer elements being operable respectively to effect movement of said clutch into opposite closed positions and the intermediate element being operable to effect movement of said clutch into neutral position, said elements being so arranged that each outer element by its position indicates the direction of travel of said member that it is capable of effecting.

17. In a machine tool, in combination, a movable member, means including a clutch for driving said member, and electric means for actuating said clutch, said electric means including a normally open circuit with a signal lamp and a circuit with a manual actuating element for effecting closing of said clutch and for effecting closing of said first mentioned circuit while said clutch is closed.

18. In a machine tool, in combination, a movable member, means including a separable connection for driving said member, an electric rotary motor for opening and closing said connection, and a system of control circuits for said motor including a circuit with a signal device and a circuit with a manual actuating element for effecting closing of said connection and for effecting simultaneous closing of said first mentioned circuit, said device and said element being located remotely of said motor and in juxtaposed position.

19. In a machine tool, in combination, a support, a member movable on said support, means including a separable connection for driving said member, electric means for opening and closing said connection, said electric means including manual control elements, a clamp for said member, electric means for applying and releasing said clamp, said last mentioned electric means including manual control elements, and a panel, all of said elements being mounted on said panel.

20. In a machine tool, in combination, a support, a member movable on said support, means including a separable connection for driving said member, electric means for opening and closing said connection, a clamp for said member, electric means for applying and releasing said clamp, and interlock means for preventing said first mentioned electric means from closing said connection when said clamp is applied and for preventing said last mentioned electric means from applying said clamp when said connection is closed.

21. In a machine tool, in combination, a support, a movable member on said support, a clamp for securing said member to said support, electric means for applying said clamp, and a system of control circuits for said means including a normally open circuit with a signal device and a circuit with a manual control element for effecting the application of said clamp and the closing of said first mentioned circuit while said clamp is applied.

22. In a machine tool, in combination, a support, a movable member on said support, a clamp for securing said member to said support, electric means for applying said clamp, and a system of control circuits for said means including a normally open circuit with a signal device and a circuit with a manual control element for effecting the application of said clamp and the closing of said first mentioned circuit while said clamp is applied, said device and said element being juxtaposed.

23. In a machine tool, in combination, a support, a movable member on said support, a clamp for said member, a shifter rod for actuating said clamp, a gear rack formed on said rod, a shaft, a gear on said shaft meshing with said rack, a worm gear segment on said shaft, a worm meshing with said segment, and a reversible torque motor for driving said worm.

24. In a machine tool, in combination, a support, a movable member on said support, a clamp for securing said member to said support, a shifter member connected to said clamp, actuating means for said shifter member, and a reversible electric motor for driving said means.

25. In a machine tool, in combination, a support formed with an internal compartment, a movable member on said support, a clamp for securing said member to said support, an actuating unit in said compartment for said clamp, and an electric motor for driving said unit to apply or release said clamp.

26. In a machine tool, in combination, a support, a movable member on said support, a clamp for said member, a shifter rod for actuating said clamp, a gear rack formed on said rod, a shaft, a gear on said shaft meshing with said rack, a worm gear segment on said shaft, a worm meshing with said segment, means for limiting the extent of rotation of said segment, and means for reversibly driving said worm.

27. In a machine tool, in combination, a support, a member movable on said support, a fixed part on said member, relatively slidable jaws mounted in said support for engaging opposite sides of said part, a lever engaging said jaws and operable upon oscillation to actuate said jaws, and means for oscillating said lever.

28. In a machine tool, in combination, a support, a member movable on said support, a fixed part on said member, relatively slidable jaws mounted in said support for engaging opposite sides of said part, a lever engaging said jaws for actuating said jaws, a toggle mechanism operatively connected to said lever, and means for actuating said mechanism.

29. In a machine tool, in combination, an operable machine element, a support for said element means for driving said element in opposite directions, said means including reversible clutch means having two operative positions for effecting movement of said element respectively in opposite directions and an intermediate neutral position for stopping said element, an actuator for said clutch means, two electric motors operatively connected to said actuator, means for limiting the operation of each motor to a range to effect movement of said clutch means through the distance between neutral position and either operative position, and electric circuits for operating said motors selectively and reversibly, whereby cumulative operation of both motors simultaneously will effect reversal of said clutch means from one to the other of said operative positions, and operation of either motor alone will effect movement of said clutch means from neutral position into one of said operative positions or from one of said operative positions into neutral position.

30. In a machine tool, in combination, an operable machine element, a support for said element, means for driving said element, said means including a control device for establishing a connection of said first mentioned means to said element to drive the latter in one direction, an actuator for said device, a lever pivotally connected to said actuator, said lever being fulcrumed at one side of said actuator, a crank arm pivotally connected to said lever at the other side of said actuator, a crank for reciprocating said arm, a worm wheel connected to said crank, a worm meshing with said wheel, and electric means for driving said worm.

31. In a machine tool, in combination, a movable machine element, a support for said element, means including a reversing clutch with a neutral position and including two opposite directional feeds for driving said element, an actuator for said clutch, a lever pivotally connected intermediate its ends to said actuator, two operating mechanisms selectively available and respectively connected to said lever at opposite sides of said actuator, one of said mechanisms being operable to move said clutch into and out of one feed position, and the other of said mechanisms being operable to move said clutch into and out of the other feed position, and both mechanisms being available for simultaneous operation to move said clutch from either one to the other of said feed positions.

32. In a machine tool, in combination, a movable machine element, means including a reversing clutch having an intermediate neutral position for driving said element in opposite directions, a shifter member for said clutch, two crank arms connected to said shifter member and operable independently or jointly to actuate said shifter member, two cranks operatively connected respectively to said arms, said cranks in the neutral position of said clutch occupying angular positions differing in phase, means for limiting the rotation of each crank to less than one revolution, two worm and worm wheel assemblies respectively connected to said cranks, and means selectively available for driving either or both of said assemblies.

33. In a machine tool, in combination, an operable machine element, a support for said element, means including a separable connection for driving said element, a shifter member for actuating said connection, a crank operatively connected to said member and rotatable in opposite directions respectively to open or close said connection, reversible drive means for rotating said crank, and abutment means for limiting said crank against rotation in either direction through more than 180 degrees.

KEITH F. GALLIMORE.